(12) United States Patent
Kirenko (10) Patent No.: US 7,889,937 B2
(45) Date of Patent: Feb. 15, 2011

(54) METHOD OF SPATIAL AND SNR PICTURE COMPRESSION

(75) Inventor: Ihor Kirenko, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 925 days.

(21) Appl. No.: 11/571,994

(22) PCT Filed: Jul. 6, 2005

(86) PCT No.: PCT/IB2005/052248

§ 371 (c)(1),
(2), (4) Date: Jan. 12, 2007

(87) PCT Pub. No.: WO2006/008681

PCT Pub. Date: Jan. 26, 2006

(65) Prior Publication Data

US 2008/0095450 A1    Apr. 24, 2008

(30) Foreign Application Priority Data

Jul. 13, 2004   (EP) ................................. 04103309

(51) Int. Cl.
*G06K 9/46* (2006.01)
(52) U.S. Cl. ....................... 382/240; 382/232; 382/251
(58) Field of Classification Search ................ 382/232, 382/240, 251; 375/E7.09, 240.03; 250/231.13; 355/20; 369/59.21, 275.3

See application file for complete search history.

(56) References Cited

U.S. PATENT DOCUMENTS 6,493,387 B1    10/2002  Shin et al.
6,959,116 B2 *  10/2005  Sezer et al. .................. 382/251

(Continued)

FOREIGN PATENT DOCUMENTS

| EP | 0971545 A1 | 1/2000 |
| RU | 2163057 C2 | 8/1998 |
| WO | 9606502 A1 | 2/1996 |
| WO | 0233952 A2 | 4/2002 |

(Continued)

OTHER PUBLICATIONS

Ulrich Benzler, Spatial Scalable Video Coding, Oct. 2000, vol. 10, No. 7.

(Continued)

*Primary Examiner*—Anh Hong Do (57) ABSTRACT

The versatile method of spatial and SNR scalable picture compression comprises: high resolution encoding (202*a*) an input picture (vi) yielding high resolution encoded data (coHR,LQ), being the base data; deriving a first down-scaled representative picture (p1) on the basis of the high resolution encoded data (coHR,LQ); deriving a second down-scaled representative picture (p2) on the basis of the input picture (vi); and lower resolution encoding (214) lower resolution quality enhancement data (coMR,MQ), usable for improving the visual quality of a picture reconstructable from the high resolution encoded data (coHR,LQ), on the basis of comparing the first down-scaled representative picture (p1) with the second down-scaled representative picture. This enables good bit-rate distribution for multi-resolution, multi-quality users.

10 Claims, 6 Drawing Sheets

U.S. PATENT DOCUMENTS

| | | | |
|---|---|---|---|
| 6,968,091 B2 * | 11/2005 | Faibish et al. ............... | 382/251 |
| 2002/0071486 A1 | 6/2002 | Van Der Schaar et al. | |
| 2003/0086622 A1 | 5/2003 | Gunnewick et al. | |
| 2004/0001547 A1 | 1/2004 | Mukherjee | |

FOREIGN PATENT DOCUMENTS

| WO | 02054774 A2 | 7/2002 |
|---|---|---|
| WO | 03036982 A2 | 5/2003 |
| WO | 2003036981 A1 | 5/2003 |
| WO | 03047260 A2 | 6/2003 |

OTHER PUBLICATIONS

Frossard et al, High Flexibility Scalable Image.

Ulrich Benzler; "Spatial Scalable Video Coding Using a Combined Subband-DCT Approach", IEEE Transactions on Circuits and Systems for Video Tech., vol. 10, No. 7 Oct. 2000, XP000964379.

* cited by examiner

METHOD OF SPATIAL AND SNR PICTURE COMPRESSION

The invention relates to a method of spatial and SNR picture compression.

The invention also relates to a method of spatial and SNR picture decoding.

The invention also relates to a corresponding picture compression device.

The invention also relates to a corresponding picture decompression device.

The invention also relates to a corresponding picture data receiver.

The invention also relates to a picture display device comprising such a picture data receiver.

The invention also relates to a picture data writer comprising such a picture compression device.

The invention also relates to software for such a compression or decoding method.

In prior art of video compression a number of scalability techniques exist. The idea behind scalability is that in a base data set the more visually relevant data is encoded for subsequent transmission, storage, etc., and depending on the requirements of a user, one or more improvement data sets may be encoded too. This may be done e.g. for a wireless transmission for which a user does not want to pay for the highest quality picture data, but rather is satisfied with the reconstructed quality obtainable on the basis of the base data set solely (e.g. because he is previewing or browsing content). Especially when he has a display only capable of rendering the base quality, this may be interesting.

These improvement data sets comprise (picture) signal information which is not present in the base data set. E.g. two techniques influencing the visual sharpness of a picture are so-called quality or SNR (signal to noise ratio) scalability and so-called spatial scalability. In the former the numerical values representing the picture content are coarsely rounded. Since in most current encoders this rounding is done on discrete cosine transform (DCT) coefficients, the result is largely a decrease in picture sharpness.

The idea behind spatial scalability is to encode in the base data set the data for a lower resolution, sub-sampled picture (typically by a factor 2). This makes perfect sense, since a higher resolution (resolution defined in this text as analogous to a number of pixels) picture can be obtained by up-scaling the low resolution picture, the resulting picture looking unsharp, just as it would if bits were saved in an SNR scalability strategy. This strategy is currently popular in the lengthy transition between standard definition (SD) television and high definition (HD) television. A user who has an HD television can either watch SD material by up-scaling, or subscribe to true HD material where the sharpness enhancement data is transmitted in a second channel. A user with an SD television can just subscribe to the basis low resolution channel.

Spatial and SNR scalability may also be combined, in that e.g. an SD user may subscribe to a low quality (SNR) version of the low resolution picture and a further quality improvement (SNR layer) of the low resolution picture, whereas the HD user may subscribe to the low quality version of the low resolution picture, upscale it, and also subscribe to a further quality enhancing layer for the high resolution picture (i.e. a picture of the high resolution comprising differential information).

Figure 1:
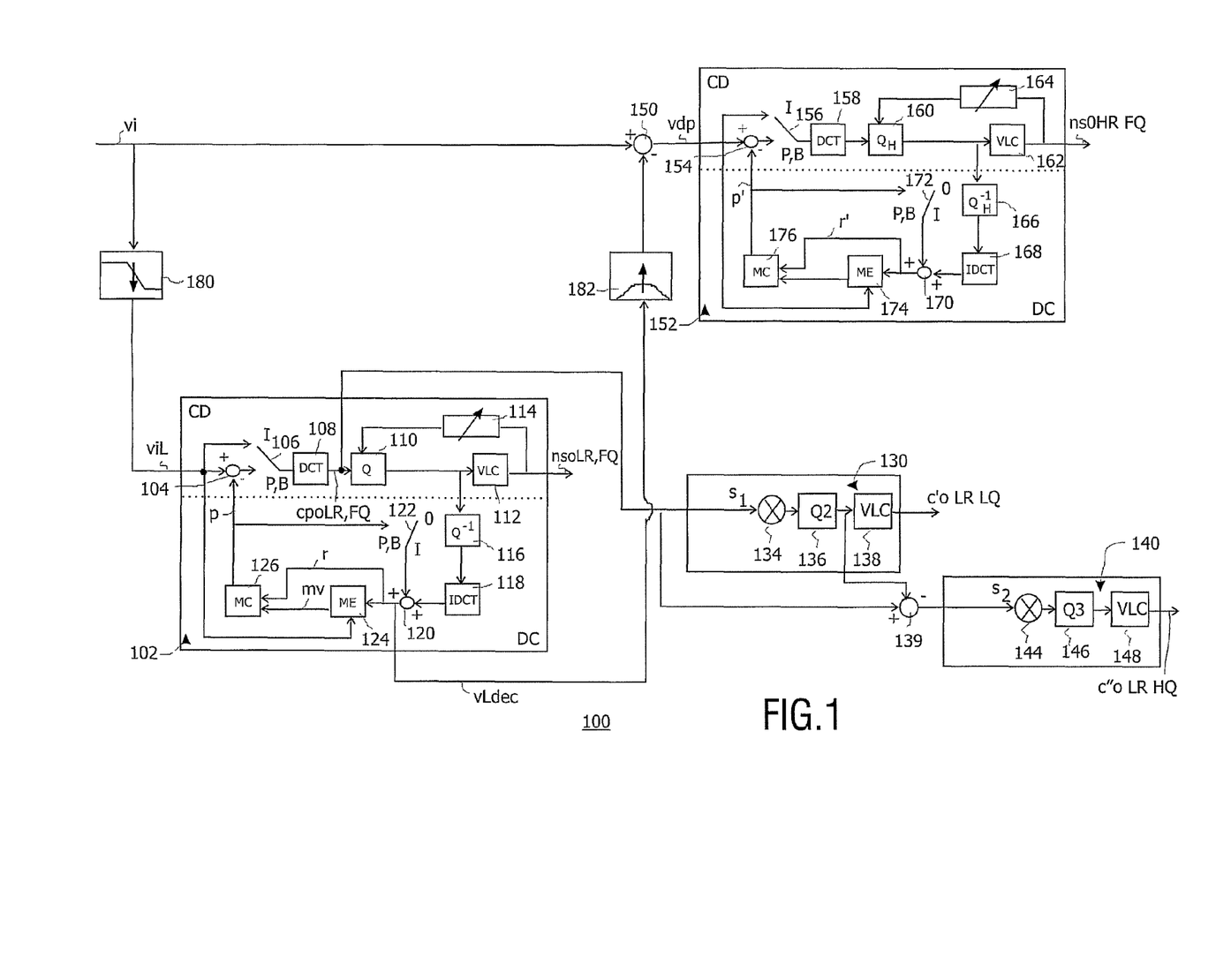
FIG. 1 schematically shows a prior art spatial-SNR video compression device.

A typical example of such a prior art spatial-SNR scalable picture coder for motion pictures is disclosed in WO 03/036981, and schematically explained in FIG. 1 of the present text. As usual for spatial scalability, the base data is of low resolution, hence the input signal vi is first downscaled and then encoded, and high resolution enhancement data is encoded on the basis of the up-scaled base data, for a high resolution user.

It is a disadvantage that this strategy of generating the base data and the enhancement data is rather rigid. This leads e.g. to the fact that the up-scaling of the base data to be used as input for the high resolution enhancement encoder (vLdec in FIG. 1) introduces artifacts (e.g. ringing), which have to be compensated by the high resolution high quality enhancement data. Hence the bits are not optimally spent since a lot of bits are required in the enhancement layer for artifact reduction, leading to the problem that to have a versatile spatial-SNR compression scheme capable of optimally servicing different users, the required amount of bits is increased compared to non-spatially scalable strategies.

It is an object of the invention to provide an alternative spatial-SNR compression scheme, which allows more versatile distribution of encoded picture data for servicing the different users.

The object is realized by a method of spatial and SNR scalable picture compression, comprising:

high [first] resolution encoding an input picture yielding high resolution encoded data (coHR,LQ);

deriving a first down-scaled representative picture on the basis of the high resolution encoded data (coHR,LQ);

deriving a second down-scaled representative picture on the basis of the input picture; and lower resolution encoding yielding lower resolution quality enhancement data (coMR,MQ), usable for improving the visual quality of a picture reconstructable from the high resolution encoded data (coHR,LQ), on the basis of comparing the first down-scaled representative picture with the second down-scaled representative picture, whereby the lower resolution (of the lower resolution encoding) is lower than and not equal to the high resolution (of the high resolution encoding).

A "main" channel of high resolution is always provided in the current method of compression, i.e. it is generated as base data in the encoder/compressor, and hence used as high resolution base data in the decompressor. Downscaling of high resolution data in the encoder is only done for calculating the enhancement layer, i.e. the base data is transmitted/stored/ . . . at its high resolution, and in the user-side decompressor only down-scaled in the case where a lower resolution output picture is required.

This is in contrast to the prior art spatial-SNR scalable coders, which always down-scale the high resolution pictures first for encoding the base data, and hence spend their base bits in the low resolution. In other words if in a prior art encoder more bits are spent in the base data, they are not spent to remove the (high resolution) unsharpness, since a high resolution user receiving only the base data will need to up-scale it to obtain a high resolution output picture. To a human observer, this means that a lot of the extra spent bits contribute to artifacts, rather than to the required high resolution image structure, which however with the high resolution base data of the invention (coHR,LQ see FIG. 2) is reconstructable as well as the amount of bits spent allows.

Figure 2:
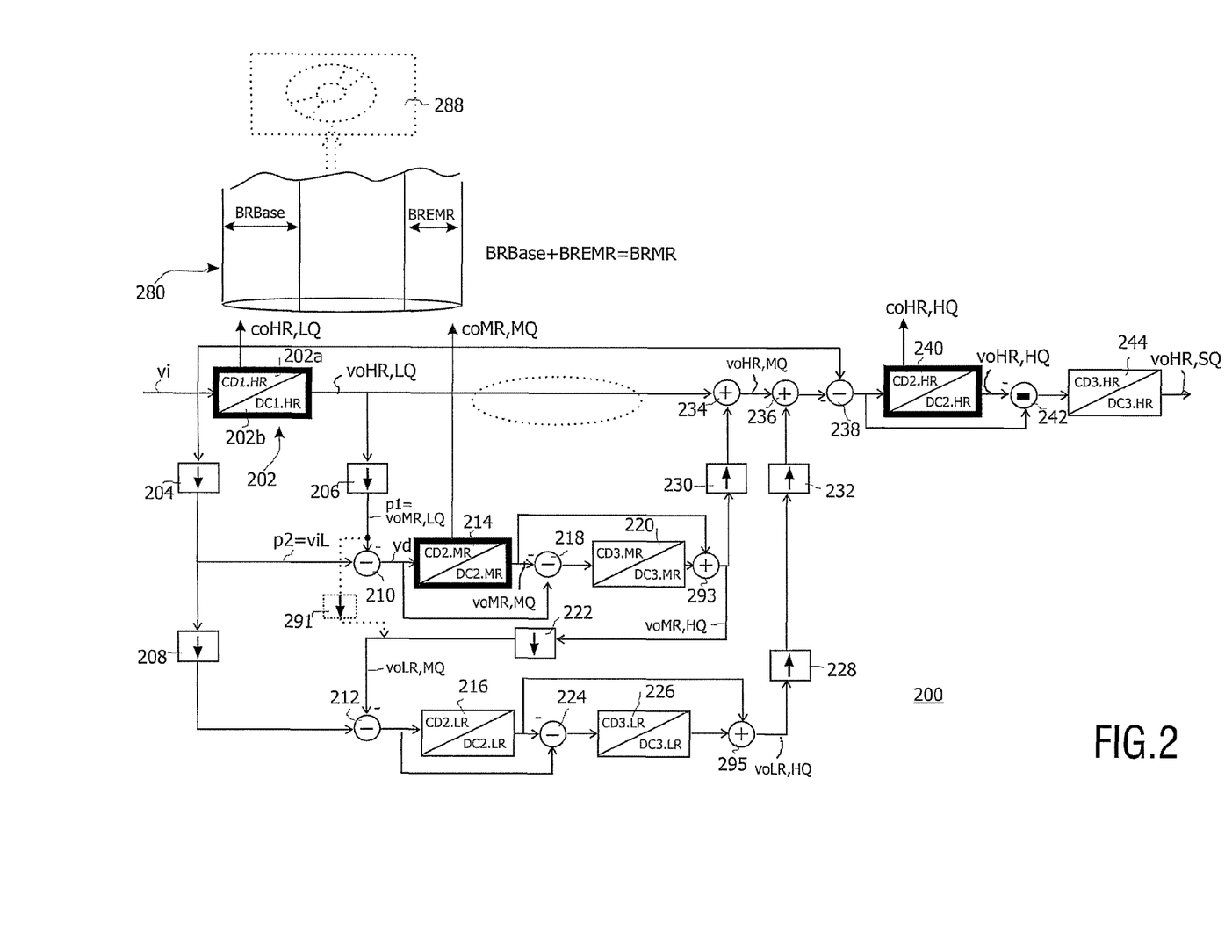
FIG. 2 schematically shows an exemplary embodiment of the picture compression device according to the invention.

In addition to the base data the current method provides one or more enhancement data streams for lower resolution, e.g. encoded lower resolution data coMR,MQ by the coder part CD2,MR of encoder 214 as shown in FIG. 2, but also in a versatile number of ways enhancement data from other resolutions may be added to increase the visible quality of e.g. the high resolution output pictures obtainable by adding appropriate up-scaled lower resolution enhancement data.

Note that the resulting high-resolution stream may be further enhanced by high resolution enhancement data such as coHR,HQ, but this is an enhancement after enhancement by lower resolution data, i.e. compensating only for the remaining errors after calculating a multiresolution/multiSNR encoding according to the invention (which absence of prior enhancement coding in the high resolution path is symbolically shown in FIG. 2 by the dashed ellipse).

Hence if at the user-side e.g. a high resolution (e.g. HD or SD being the main channel) output is required—the user subscribing e.g. to encoded data streams coHR,LQ, coMR, MQ and coHR,HQ and taking output pictures from decoder output 323 (see FIG. 3)—then since the dominant picture content is based on the unscaled high resolution data stream coHR,LQ, any high resolution enhancement data coHR,HQ should at most compensate for up-scaling errors of the low resolution enhancement data coMR,MQ only, hence bits can be divided more wisely between coHR,LQ and coMR,MQ taking into account visual quality in the chain comprising up-scaling and down-scaling.

Also for a lower resolution (e.g. SIF) user, there will be no up-scaling artifacts, hence coHR,LQ and coMR,MQ may be tuned to give this user anything from a reasonable to even a high quality picture.

In general the bits are optimally divided so that both the lower resolution and high resolution users have satisfactory to good qualities, depending e.g. on particular distribution constraints. A first provider may e.g. want to service mostly the SD television users, but still incorporate a layer for SIF mobile viewers, the entire chain being optimized (a priori and fixed or on the fly) so that the lower resolution enhancement data will optimally contribute to the high resolution picture as well as the lower resolution pictures, according to prespecified weighing criteria. Alternatively a second provider may have a larger market in the lower resolution being SD television, while still wanting a reasonable picture on the high resolution being HD television, but for a reduced number of users.

It should be emphasized that high resolution should not be interpreted unnecessarily limitative: although in the example of FIG. 2 the "main" high resolution channel is the one with the highest resolution available, even higher resolutions may be generated with methods complementary to the method of the present invention, e.g. with prior art up-scaling, possibly augmented with enhancement data in a way similar to the way illustrated in FIG. 1. The main/high resolution channel in this invention is defined as an important well-used resolution which may be enhanced with data from lower resolutions as described, or contribute its own data to reconstruct pictures of lower resolution.

Under picture is to be understood any preferably connected collection of picture data elements, hence not only a rectangular picture, but also an irregularly shape picture object, and both single still pictures and sequences of pictures (motion pictures).

In an embodiment of the method, deriving the first down-scaled representative picture comprises:

decoding the high resolution encoded data, yielding high resolution decoded data (voHR,LQ); and down-scaling the high resolution decoded data, yielding low quality lower resolution decoded data (voMR,LQ) being the down-scaled representative picture, and deriving a second down-scaled representative picture is done by down-scaling a non-encoded input picture, yielding a lower resolution version of the input picture being the second down-scaled representative picture, and the comparing comprises subtracting the low quality lower resolution decoded data from the lower resolution version of the input picture.

The subtraction is typically pixel-wise.

Apart from such down-scaling on the decoded signals, the skilled person should realize that the down-scaling can also be performed in the encoded domain.

In a further improvement of any of the two above implementations of the method adapted for sequential input pictures, the high resolution encoding yields the high resolution encoded data with a bit-rate lower than or equal to a prespecified first bit-rate (BRBase).

It is advantageous if few bits are spent in this stream, namely a minimum acceptable amount, which may be determined on the basis of such considerations as e.g.:

if the enhancement data is not subscribed to or not (correctly) received, e.g. because of interference, this base data still gives a reasonable quality picture, e.g. on the typical display of a user of the selected provider (e.g. an average size SD television display), or for a certain transmission channel technology this is a channel budget to which a user can subscribe for a reasonable price, according to a business model.

In a further specification of the previous embodiment, the high resolution encoding is tailored to yield the high resolution encoded data with a fixed or maximum first bit-rate (BRBase) between 100 and 400 kbit/s, and preferably a minimum bit-rate of 100 kbit/s. This according to experimental verification yields good quality sequences on most current SD and SIF displays.

In a further elaborated embodiment the sum of the bit-rates of the high resolution encoded data (coHR,LQ) and the lower resolution quality enhancement encoded data (coMR,MQ) is smaller then or equal to a specified second bit-rate (BRMR). In other words a provider can optimally specify budgets for both kinds of users, a high resolution HR user and a lower resolution user, for a certain average guaranteed quality. The users may further decide to subscribe to further enhancement streams if any are present.

It is advantageous for compression of sequences of pictures if the high resolution encoding and the lower resolution encoding each have their separate motion estimation and motion compensation steps.

The SNR streams may be generated purely on the basis of different quantization as in prior art. However, all encoder/(decoder) blocks for the different resolutions and SNR levels as in FIG. 2 may be full-encoders (as block 102 in FIG. 1) with motion prediction, and each with their separately estimated motion vectors (e.g. for a second enhancement different picture). This has the advantage that standard (e.g. MPEG) encoders can be used, which is especially versatile in e.g. parallelization of the compression in software, or on a processor with a bank of standard encoders, where a control strategy can take processing load into account. Lastly, the evident point is emphasized that no actual decoders are needed since they already form part of an encoder and the required reconstructed signals may be directed from inside the encoder to an output (as e.g. vLdec in FIG. 1).

A complementary method of decoding spatial and SNR scalable encoded picture data comprises:

receiving high resolution encoded data (coHR,LQ);

further receiving lower resolution quality enhancement encoded data (coMR,MQ) for improving the visual quality of a picture reconstructable from the high resolution encoded data; and constructing an output picture of an output resolution smaller than or equal to the high resolution on the basis of the high resolution encoded data and the lower resolution quality enhancement encoded data scaled to the output resolution.

Figure 3:
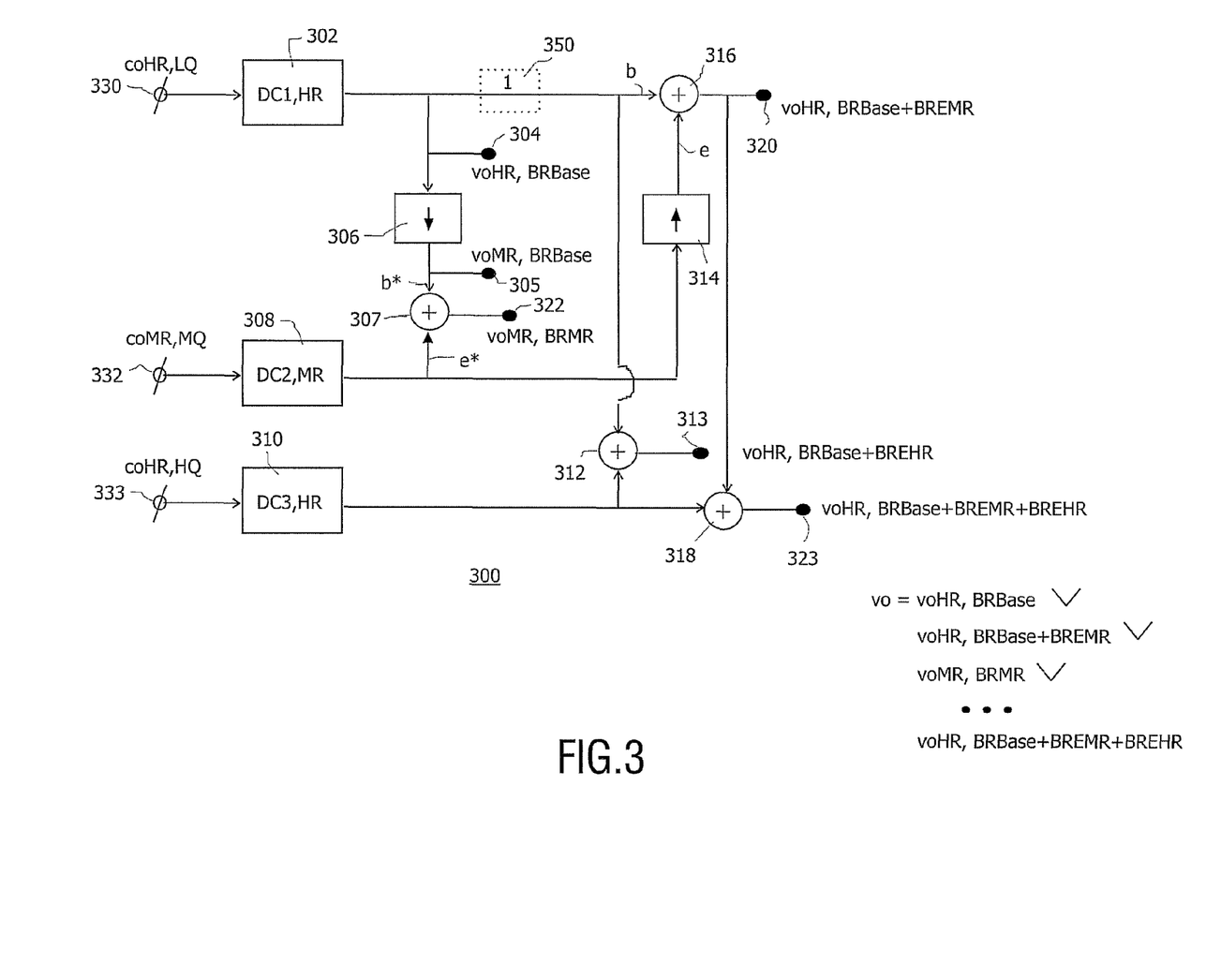
FIG. 3 schematically shows an embodiment of a complementary picture decompression device according to the invention.

With the present encoding strategy, a user has in a simple way many streams at his availability to which he can subscribe and which he can decode, and from which due to the combinatorics with the scale convertors a manifold of different reasonable to good quality pictures for different screen sizes can be derived (e.g. in FIG. 3, 6 different resolution-quality outputs can be derived with as required hardware only 3 decoders and 2 scale convertors. For all output pictures however, the high resolution low quality stream encoded data (coHR,LQ) has contributed, i.e. it as to be received and decoded.

This decoding method provides also versatility in the business models for the provider and the subscriber, who can after a cost calculation subscribe to any of a number of stream combinations having an acceptable quality. This may be done on the fly if the user switches from a first stream to a second, e.g. by redirecting the stream from a first screen in a first room to a second screen in a second room. This resetting may also be advantageously done based on already stored streams (e.g. the lower resolution enhancement data coMR,MQ gets another meaning when the user switches to a higher resolution screen and as it is processed differently to contribute to the high resolution output pictures).

A provider, e.g. a redistributors such as a cable company receiving data from a satellite, may use picture data encoded by any of the above methods, the picture data comprising high resolution encoded data (coHR,LQ) and corresponding lower resolution quality enhancement encoded data (coMR,MQ) for improving the visual quality of a picture reconstructed on the basis of the high resolution encoded data (coHR,LQ), in a method of transmitting the data over a transmission path.

A spatial and SNR scalable picture compression device specially adapted to perform the method according to the invention is disclosed comprises:

a high resolution encoder arranged to encode an input picture into high resolution encoded data (coHR,LQ);

first down-scaling means arranged to derive a first down-scaled representative picture on the basis of the high resolution encoded data;

second down-scaling means arranged to derive a second down-scaled representative picture on the basis of the input picture; and a lower resolution encoder arranged to yield lower resolution quality enhancement data (coMR,MQ), usable for improving the visual quality of a picture reconstructable from the high resolution encoded data, on the basis of a comparison signal from a comprised comparator arranged to compare the first down-scaled representative picture with the second down-scaled representative picture, whereby the lower resolution is lower than and not equal to the high resolution.

This device may typically be a dedicated ASIC or unit, or a processor running software encoding its performance.

In an embodiment of the picture compression device:

the first down-scaling means comprises a serial processing chain of a decoder arranged to decode the high resolution encoded data (coHR,LQ) into high resolution decoded data (voHR,LQ) and a down-scaler arranged to down-scale the high resolution decoded data into low quality lower resolution decoded data (voMR,LQ) being the down-scaled representative picture;

the second down-scaling means comprises a non-encoded signal down-scaling unit arranged to down-scaling a non-encoded input picture into a lower resolution version of the input picture being the second down-scaled representative picture; and the comparator comprises a subtracter arranged to subtract the low quality lower resolution decoded data from the lower resolution version of the input picture, yielding the comparison signal.

With the compression device corresponds a special spatial and SNR scalable picture decompression device, comprising:

a means for receiving high resolution encoded data (coHR, LQ);

a means for receiving lower resolution quality enhancement encoded data (coMR,MQ) for improving the visual quality of a picture reconstructable from the high resolution encoded data (coHR,LQ);

at least one scaling means arranged to scale an inputted picture from its input resolution to a predetermined output resolution;

an adding means for adding together two input pictures; and at least one decoding means arranged to decode an encoded input picture; wherein the scaling, adding and decoding means are connected in picture processing order as:

firstly a high resolution decoder arranged to decode the high resolution encoded data (coHR,LQ) yielding high resolution decoded data (voHR,LQ) and a lower resolution decoder arranged to decode the lower resolution quality enhancement encoded data (coMR,MQ) yielding lower resolution quality enhancement decoded data (voMR,MQ), subsequently a down-scaler arranged to down-scale the high resolution decoded data (voHR,LQ) to the predetermined output resolution, yielding a base picture and a scaler arranged to scale to the predetermined output resolution the lower resolution quality enhancement decoded data (voMR, MQ), yielding an enhancement picture, and lastly an adder arranged to add the base picture and the enhancement picture, yielding an output picture; or firstly a first scaling means arranged to down-scale the high resolution encoded data (coHR,LQ) to the predetermined output resolution and a second scaling means arranged to scale the lower resolution quality enhancement encoded data (coMR,MQ) to the predetermined output resolution, the output pictures of which are subsequently added in an adder, the output of which is lastly decoded in a decoder; or firstly a first scaling means arranged to down-scale the high resolution encoded data (coHR,LQ) to the predetermined output resolution and a second scaling means arranged to scale the lower resolution quality enhancement encoded data (coMR,MQ) to the predetermined output resolution, subsequently a first and a second decoder arranged to decode the respective resulting pictures, and lastly and adder arranged to add the resulting pictures.

Some of the scalers may perform a unity scaling (i.e. transform to the same resolution; in fact do nothing).

The above decompression device is advantageously comprised in a picture data receiver further comprising:

a connection for receiving decoded picture data; and a data receiving unit arranged to receive desired encoded picture data through the connection and arranged to condition and output it into a standard encoded picture format.

An embodiment of the above picture data receiver further comprises a processor arranged to determine a decompression mode indicating from which data combination output pictures to be output via output are to be reconstructed, the combination at least including high resolution encoded data (coHR,LQ) and lower resolution encoded data. In this way (on-the-fly) reconfigurations of the data encoding can be done, e.g. if the user switches from a first to a second screen on his mobile device or from a first providing service to a second.

The picture data receiver is advantageously comprised in a picture display device, e.g. a television receiver, or mobile communication device such as a PDA or mobile phone, further comprising a display, such as e.g. an LCD or connected picture projection unit.

Another advantageous apparatus applying the presented method is a picture data writer comprising the spatial and SNR scalable picture compression device arranged to supply during operation encoded data (coHR,LQ, coMR,MQ) to a memory, such as e.g. a releasable disk or a fixed hard disk or a solid state memory, comprised in the picture data writer. A typical apparatus of this kind is a DVD recorder or similar, and another example is a personal computer with the required memory accessing hardware and its processor running software encoding the method according to the invention.

These and other aspects of the picture compression and decoding methods, the picture compression and decompression devices, the picture data receiver, the picture display device and the picture data writer according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional.

FIG. 1 schematically shows a typical embodiment of a (also SNR scalable) spatial scalable coder 100 as known from prior art (e.g. WO03/036981). An input picture signal vi is down-sampled in down-sampler 180—after appropriate anti-aliasing as well-known in the art (low-pass filtering, Gaussian blurring, . . . ) —yielding a low resolution version viL of the input signal vi, typically of half resolution. E.g. if the input picture signal vi is of standard definition (SD) resolution (e.g. 720×576 pixels), then the low-resolution signal viL is of SIF or CIF resolution (360*288 pixels in PAL, actually the divisible by 16 size 352×288). This low-resolution signal viL is encoded by a low resolution encoder 102 (encoding the base data). In this embodiment a DCT-transformed representation cpoLR,FQ is encoded as a number of (scalable) streams of different quality/SNR (c'o and c"o; the resolution and quality indices dropped) by first and second quantized stream generator units 130 and 140 [Note that the wording "stream" which is used in the present text should not be interpreted narrowly: for simplicity it is assumed that the different data is streamed in different streams along the same or different channels from a producer to a consumer of the data. However the data may be presented in any equivalent technological representation, e.g. for a still picture it may reside in a portion of a memory, being the equivalent of the stream]. On the basis of a low resolution signal vLdec, as it was decoded from the quantized DCT-transformed representation cpoLR,FQ (which may be available at the receiver/decoder side from an outputted non-scalable stream nsoLR,FQ), enhancement information is encoded by a high resolution encoder 152, which encodes a high resolution sharpness enhancement signal to be added at the decoder side to the low resolution signal, which is due to the anti-alias filtering and pixel dropping of the down-sampling 180 unsharp. This is done by up-scaling (up-sampling) 182 the low resolution signal vLdec to standard resolution and comparing it with the original input signal vi with a subtracter 150, yielding a residue signal vdp which is encoded to the required accuracy, taking into account factors such as e.g. available bandwidth of a transmission path. Mutatis mutandis this high resolution difference signal may also be encoded with different scalable SNR streams (similar to 130 and 140, not shown).

Low resolution encoder 102 is of a standard type used in video encoding standards such as MPEG, H26x, AVC (Advanced video coding). The pictures of a moving scene are encoded in so-called groups of pictures (GOPs), which start with an intra (I) picture which is encoded based on the data of only the original picture at the corresponding time instant (i.e. as if it was a static picture not part of a moving scene). The following pictures of the GOP are coded taking into account the redundancy of information in a moving scene. E.g. a background texture may simply exhibit a translationary motion to the left, while a foreground person may move to the right and turn slightly. In this simplified example, most of the background pixels in consecutive pictures can be regenerated by simply re-drawing the background pixels of previous pictures in the new picture to be regenerated at offset positions, without the necessity of additional information. Hence, some of the pictures of the GOP are so called predictive (P) encoded by first moving all objects (or actually pixel blocks which compose the objects) to their expected positions in the picture to be regenerated. Since there are always differences with the original (e.g. due to changes in illumination, or the slight turning of the person) the difference with the original need also be coded (and added as a correction at the decoder side to obtain substantially the original picture content), but this requires far less bits than encoding the picture in an intra way. Once a P picture has been generated in a position in the future compared to an I picture, intermediate pictures can be predicted bidirectionally (B-pictures), e.g. from the past or future only, or from a combination of both predictions.

This behavior is enabled in low-resolution encoder 102 by means of switch 106. In the I-picture setting, the original picture is first on a block-by-block basis transformed to blocks of DCT (discrete cosine transform) coefficients by a discrete cosine transformer 108. This transformation is completely reversible, hence after this operation there is not much compression gain. Therefore quantization is introduced in the form of quantizer 110. A number of image transformations can be applied on the DCT blocks for reducing the amount of information, leading to a difference with the original which is hardly visible. One such transformation is that the values of transform coefficients can be rounded off. E.g. a DC coefficient value (lying between 0 and 255) equal to 127 may be rounded off to 128. A rounding to e.g. a nearest multiple of 2 can also be implemented as a division by two (or multiplication by scale factor ½) and a rounding to the nearest integer (and a multiplication by 2 for reconstruction at the encoder side). This exemplary rounding leads to the saving of 1 bit per coefficient.

Hence in the known video encoding strategies, quantization typically consists of a divisional scaling with a constant s of all the coefficients and then quantizing (rounding) with a fixed matrix containing different rounding factors for different DCT coefficients. The rationale is that higher frequency coefficients can be quantized more coarsely, since this only results in a less annoying reduction in sharpness of the picture. This single factor scaling is an easy way to control the bitrate. The coefficients emerging from the quantizer are subjected to a further bit reduction in a variable length encoder 112. This variable length encoder 112 employs the fact that some bit patterns have a greater probability of occurring than others (e.g. a number of consecutive zero value coefficients will occur, after noisy small DCT coefficient values have been quantized to zero), hence they are mapped to small code words whereas the infrequent runs are mapped to long codewords, leading to a net reduction in the number of required bits. The hence outputted encoded stream nsoLR,FQ (non SNR-scalable, i.e. of "full" quality FQ) contains a number of bits per picture, which varies dependent on the picture content, such as e.g. a lot of high-frequency coefficients for textured background, or a lot of information in difference pictures correcting the predicted P,B pictures in case there is a lot of movement in the scene. However, there may be constraints such as e.g. a limited bandwidth of the transmission channel, or limited processing capabilities of the decoder, hence it is typically desirable to control the output bit-rate. A controller 114 can easily do this be adapting the scaling constant s, e.g. dividing all coefficients by 4 results in a quality reduction, but also in a saving of 2 bits per coefficient. Note that the scaling is not shown in the low-resolution coder, since it outputs a "full"-quality stream.

A typical encoder comprises apart from such an encoding part (CD above the dashed line) also a decoding part, because in the predictive/corrective (P,B) mode the encoder needs to know what the decoder obtains. Hence an inverse quantization 116 undoes the quantization (which results in a mainly unsharp picture with quantization errors compared to the original, the magnitude of which is dependent on the coarseness of the quantization), and an inverse DCT 118 regenerates a video picture on the basis of the quantized DCT coefficients. This reconstructed picture at time instant t−1 is inputted in a motion estimator 124 together with the newly inputted original image viL(t) and a motion of each block is determined. Such motion estimator typically uses "full search block matching", but more advanced motion estimators such as 3D Recursive Search may also be used (see e.g. WO0188852). With the resulting motion vectors mv, the reconstructed picture r is motion-compensated to the new time instant t by motion compensator 126. The encoder is in predictive mode for the remainder of the GOP (switch 106 to setting P,B), and the following picture is a P-picture. Hence subtracter 104 outputs the difference between the motion-compensated/predicted picture p and the new inputted picture viL(t), and this residue picture is now processed mutatis mutandis by the above described chain of units. Adder 120 is now operative to add the reconstructed residue picture outputted by inverse DCT 118 to a previous motion-compensated prediction p(t), and the rest of the processing continues mutatis mutandis.

The SNR-scalability (in the example of the low resolution data) may be realized as follows. The first quantized stream generator unit 130 scales with a multiplier (or divider) 134 all coefficients with a large/coarse dividing constant $s_1$ (e.g. equal to 16), after which quantization 136 (with matrix Q2, which may be a standard matrix identical to Q of the encoder part of encoder 102, or specifically predetermined) and variable length encoding 138 is performed. The outputted stream is of low quality, and of course low (SIF) resolution. E.g. all coefficient values between 0 and 255 could be rounded to the nearest decade, making 127 equal to 130. Subtracter 139 derives a difference signal of the original input and the coarsely quantized representation, having a smaller range (the range in the example being 10, and the difference 3), and this difference signal is coded by the quantized stream generator unit 140, e.g. rounding to the nearest factor of two, i.e. yielding a 4 instead of a 3, resulting in a negligible final error.

The high-resolution encoder 152 is constructed and functions mutatis mutandis, only now the residue signal vdp is inputted, and hence the motion estimation, quantization, prediction etc. is done on those residue pictures.

As an input to derive the residue signal vdp by comparing with the original input signal vi, the decoded picture vLdec is upscaled by up-scaler 182, using any of the interpolation strategies of prior art. The residue signal vd is input to a positive input of a subtracter 154, which output is connected to a switch 156 with I and P,B states, connecting to a discrete cosine transformer 158, which output is connected to a rate-controllable quantizer 160, which output is connected to a variable length encoder 162 and an inverse quantizer 166, which output is coupled to an inverse DCT 168. The output of the IDCT 168 connects to an adder which is arranged to add depending on the position of a switch 172 either nothing or a previous residue prediction to the regenerated residue after predicting the current residue picture, which resultant signal r' is inputted in a motion estimator 174 and a motion compensator 176, yielding a prediction of the current residue picture as an input to subtracter 154. In the schematic embodiment the output is only a non-scalable high-resolution stream nso-HR,FQ, although multiple high-resolution SNR streams may be generated in a way similar as for the low resolution.

FIG. 2 schematically shows an embodiment of the spatial and SNR scalable picture compression device 200 according to the invention.

The picture compression device 200 is arranged to receive an input picture signal vi, which may be uncompressed, for example a received analog television signal according to the PAL standard when the picture compression device 200 is in a DVD recorder or a signal from a (e.g. consumer) camera CCD when the picture compression device 200 is in a camera system, but the input signal vi may also be a compressed signal in a transcoder embodiment in which case the encoders are arranged to perform first a decoding to an intermediate format (typically a waveform signal according to a television standard). The terms "input picture" and "signal" are to be understood broadly as any representation of a graphical object, but in the remainder to explain more clearly the working of the picture compression device 200 it is assumed that if decoding is required it is performed before a resulting unencoded picture signal vi enters the picture compression device 200.

A high resolution encoder 202 encodes the most important part of the input picture vi (e.g. in a DCT encoder the most significant bits of at least the low frequency coefficients) into high resolution encoded data coHR,LQ. In the case of motion pictures input (a video signal input vi), this encoder 202 is typically composed of two parts, namely an encoder part 202a and a decoder part 202b. The exemplary picture compression device 200 embodiment described is arranged to compress video compatible with such standards as MPEG2 or Advanced video coding (AVC) [the latter standard is recently specified by the Joint Video Team (JVT) of ISO/IEC MPEG & ITU-T VCEG (ISO/IEC JTC1/SC29/WG11 and ITU-T SG16 Q.6], but the skilled person can easily modify the picture compression device 200 so that it performs similar on other currently known or future picture compression standards.

The high resolution encoder 202 for motion picture encoding may typically be of the structure of encoder block 102 of FIG. 1, and also produces on an output connection high resolution decoded data (voHR,LQ), again e.g. according to an analog or digital waveform television standard.

The controller (see 114 in FIG. 1) of the high resolution encoder 202 is typically so (adaptively) pre-arranged that the bit-rate of the outputted high resolution encoded data coHR, LQ is substantially equal to a first bit-rate BRBase, e.g. equal to a value which guarantees a minimum (acceptable) visual quality and is e.g. feasible over the transmission channel. Experiments have shown that reasonable pictures can be obtained with a first bit-rate equal to or below 300 kbit/s and even up to 100 kbit/s (for SD resolution of 720×576 pixels), especially when later enhanced with enhancement data.

The input picture vi is downscaled (after appropriate anti-aliasing; not shown anymore in the schematic FIG. 2) by a down-scaler 204 to the lower resolution (e.g. half the input resolution, but other (non)-fractional resolutions may be applied mutatis mutandis) and similarly the high resolution decoded data (voHR,LQ) is down-scaled to the same lower resolution by a second down-scaler 206, yielding low quality lower resolution decoded data (voMR,LQ). These two signals constitute a version according to this particular embodiment of a second down-scaled representative picture p2 respectively a first down-scaled representative picture p1, the comparison of which will further steer the enhancement data encoding.

The down-scaled input picture viL (=p2) and the low quality lower resolution decoded data (voMR,LQ) are compared, typically for simplicity by a subtracter 210 (although more elaborate comparators may be employed comparing the signals taking into account knowledge of the visual system, and e.g. supplying additional data to the further enhancement encoders that more enhancement data should be encoded around particular edges and less in particular textures), yielding as output a difference signal vd. The difference signal indicates the quantization errors made by the high resolution encoder 202, but in a down-scaled resolution (when this difference picture is upscaled again there will still be additional up-scaling/ringing errors, hence the information in difference signal vd is not exactly equal to the information lost in the high resolution encoding 202, but approximately it is. This difference vd, which is what is required by a lower/SIF resolution viewer to have a perfect picture (identical to the down-scaled input picture vi, which down-scaling may be according to a fixed down-scaling strategy or with an optimized down-scaling adapted to a particular intended low resolution display as desired), may be encoded to any quality/accuracy (SNR) by a lower resolution encoder 214 arranged to output lower resolution quality enhancement encoded data (coMR,MQ). This lower resolution encoder 214 may also be constructed as block 102 in FIG. 1, i.e. it may predict the difference picture vd from a previous picture and (DCT or otherwise) encode a correction. Alternatively, it may also be constructed without a motion prediction part (i.e. without a decoder part as in 102) but rather the "static" difference picture vd (e.g. in the DCT domain) may be quantized into one or more enhancement data streams, e.g. lower resolution encoder 214 comprised an encoding block similar to block 130 of FIG. 1.

Allocating particular second bit-rate BRMR for the total data stream enables a lower resolution (e.g. SIF) viewer to have a good visual quality picture: the resulting bit-rate (budget) for the lower resolution encoder 214 follows from simple subtraction:

$$BREMR = BRMR - BRBase \quad [Eq. 1]$$

As mentioned before the difference picture vd is also not such a bad estimate of the errors made by the high resolution encoder 202 in the high resolution format, hence any lower resolution enhancement data (e.g. coMR,MQ) may also contribute to a quality improvement for a high resolution user, after properly up-scaling. The up-scaling may use any interpolation strategy known from prior art, e.g. simple linear interpolation or multi-pixel weighing in the spatial pixel domain or transform based upscaling. The combination of the two streams coHR,LQ and coMR,MQ at the receiver side may already lead to an acceptable quality picture, but a high resolution user may typically want a better quality, hence the compression device 200 may typically comprise a further high resolution enhancement encoder 240, arranged to encode to a certain accuracy/visual quality (e.g. measured by signal to noise ratio SNR or a psychovisual function) or bit-rate the remaining difference with the input picture vi, yielding high resolution enhancement encoded data coHR, HQ. This high resolution enhancement encoded data coHR, HQ may in turn be used to yield improved lower resolution pictures for lower resolution users.

The encoder predicts what the decoder is able to reconstruct by adding the lower resolution enhancement data (after up-scaling) to the high resolution base data in an adder 234 (an similarly adder 236; note that in resource saving embodiments a skilled workman may combine some of the adders and/or up-scalers). This total reconstructed signal (voHR, MQ) is compared with the input signal in a subtracter 238, which yielded difference is further encoded as further high resolution enhancement data by high resolution enhancement encoder 240, and if required even further enhancement encoders like encoder 244.

If such high resolution enhancement encoded data coHR, HQ is known to be going to be used by both a high resolution and lower resolution user, the content provider may arrange his picture compression device 200 so that the enhancement is not a mathematically exact compensating enhancement for the errors still remaining after a decompression chain (based on coHR,LQ and coMR,MQ) in the high resolution, but rather he may produce a high resolution enhancement stream coHR,HQ with average properties (typically at least its bit-rate, but other compression settings may be averaged such as e.g. bits spent for the motion vectors, contribution of high frequency coefficients via a variable quantization matrix etc.) for the both users.

In the exemplary embodiment it is further shown how more resolutions and SNR enhancement layers may be added, a number of combinations being possible as the skilled person will realize. In the example a further enhancement encoder 220 is comprised in the lower (here medium) resolution path for obtaining a resulting medium resolution high quality decoded signal voMR,HQ by adding the already encoded lower resolution medium quality signal voMR,MQ to the further enhancement data from encoder 220 in adder 293 (a similar construction with adder 295 is shown in the low resolution processing path). In this exemplary embodiment, the medium resolution high quality decoded signal voMR,HQ forms the basis for encoding further data (for enhancing at either of the resolutions) on an even lower resolution (here low), by comparing with a comparator 212 the already encoded signal (the medium resolution high quality decoded signal voMR,HQ down-scaled by down-scaler 222) with a similarly down-scaled version of the original input picture vi (by down-scaler 208), and on the basis thereof encoding further enhancement data with low resolution enhancement encoders 216 and 226.

Alternatively the skilled person may construct a (fixed or adaptive) encoding scheme for encoding the low resolution enhancement data on the basis of down-scaling a representation of the base encoded signal voMR,LQ (dashed arrow behind 206, and down-scaler 291). The high resolution signal may also be further enhanced with encoder 244, yielding finally a high resolution super quality signal, and all its corresponding encoded versions.

A transmission channel 280 is shown symbolically with a first channel part for the base stream and a second channel part for an enhancement stream. In a picture data writer this transmission channel may e.g. be a bus to a memory 288, e.g. solid state or disk based.

FIG. 3 schematically shows an exemplary picture decompression device 300. A means 330 for receiving high resolution encoded data coHR,LQ is comprised and typically realized as a connector to a channel (e.g. cable t.v.) e.g. a wire socket or pin of a digital connector. Similarly there is a means 332 for receiving lower resolution quality enhancement encoded data (coMR,MQ), and there may be further picture receiving means such as e.g. receiving means 333 for high resolution enhancement encoded data coHR,HQ. The three encoded input streams are decoded respectively by a high resolution decoder 302, a lower (medium in the example) resolution decoder 308 and a high resolution enhancement decoder 310. A user having this full decoding capability (e.g. because he uses standard software encoders, which may be arranged to encode in parallel parts of a picture and several enhancement layers) can with the aid of two picture scalers already arrive at 6 different resolution-quality levels. E.g., if the user wants pictures of a predetermined output resolution equal to the high resolution, he can subscribe to (in the case where the enhancement streams cost too much)/or decode (with resource-constrained devices, e.g. to save battery power for a portable device) only the base data into the high resolution decoded data voHR,LQ. Therefore he accesses output 304 (e.g. a pin of an IC or a cable socket on the back of a standalone apparatus containing the decompression device 300) which is at least during operation—i.e. e.g. after the device has been configured into a particular decompression configuration—logically connected to the high resolution decoder 302. Hence on this output the user has access to an output picture vo being a decoded low quality high resolution version voHR,LQ of the signal. A down-scaler 306 is comprised to receive this decoded signal as input and arranged to down-scale it. There may be a second output 305 for accessing a low quality lower resolution version voMR,BRBase, both signals requiring a bit-rate substantially equal to BRBase. Adder 307 provides a first possibility to combine an example of a base picture b* and an enhancement picture e*, namely its first input is connected to receive the down-scaled high resolution decoded data voHR,LQ and its second input is connected to receive the decoded lower resolution quality enhancement data (voMR,MQ) outputted by lower resolution decoder 308, and its output is connected to output 322 for supplying a lower resolution enhanced signal voMR,BRMR. In the case where the predetermined output resolution is equal to neither of the two encoded received resolutions (e.g. intermediate between or lower than those two resolutions), two scalers are required to yield the required base picture b* and an enhancement picture e*, as a skilled person is able to connect. The user may also access a high resolution signal at high resolution high quality output 320. In this case if the predetermined output resolution is equal to the high resolution, a down-scaler 350 is actually not required, which may in practice be realized by arranging an available scaler so that it scales to the same resolution (i.e. performs a unity transformation or no transformation at all) in a re-configurable system, or in a cheap fixed system the scaler may not actually be physically present in that it is replaced simple by e.g. a cable connection. The base picture b is hence the decoded high resolution picture outputted by the high resolution decoder 302, and the enhancement picture is obtained from the output of an up-scaler 314, which input is connected to the decoded output of the lower resolution decoder 308. Similarly by decoding the high resolution enhancement data, two further signals may be obtained at outputs 313 and 323, the later giving the highest quality signal voHR,BRBase+BREMR+BREHR.

It is emphasized that to each reconstructed signal the high resolution base data coHR,LQ has contributed, even to signals having a lower resolution, this fact making the decoder special. The skilled person can construct decoders mutatis mutandis for more resolutions and/or SNR enhancement data.

The reconstruction, and in particular the required up- and/or down-scaling is in the exemplary embodiment realized on the decoded signals, but a similar decoder can be constructed in which the scaling is performed in the (e.g. DCT) transform domain. Hence there are three possibilities for constructing the decompression device 300:

first decoding, then scaling, then adding;
first scaling, then decoding, then adding; and
first scaling, then adding, then decoding the resultant signal.

The second variant is typically constructed as scaling means arranged to down-scale the high resolution encoded data (coHR,LQ) to the predetermined output resolution and a second scaling means arranged to scale the lower resolution quality enhancement encoded data (coMR,MQ) to the predetermined output resolution which are typically comprised in the decoders themselves and the DCT coefficients apart from the DC are e.g. shifted which may be combined with further filtering. The outputted scaled decoded pictures are then added in an adder.

In the last variant all processing may happen in a single decoder.

Figure 4:
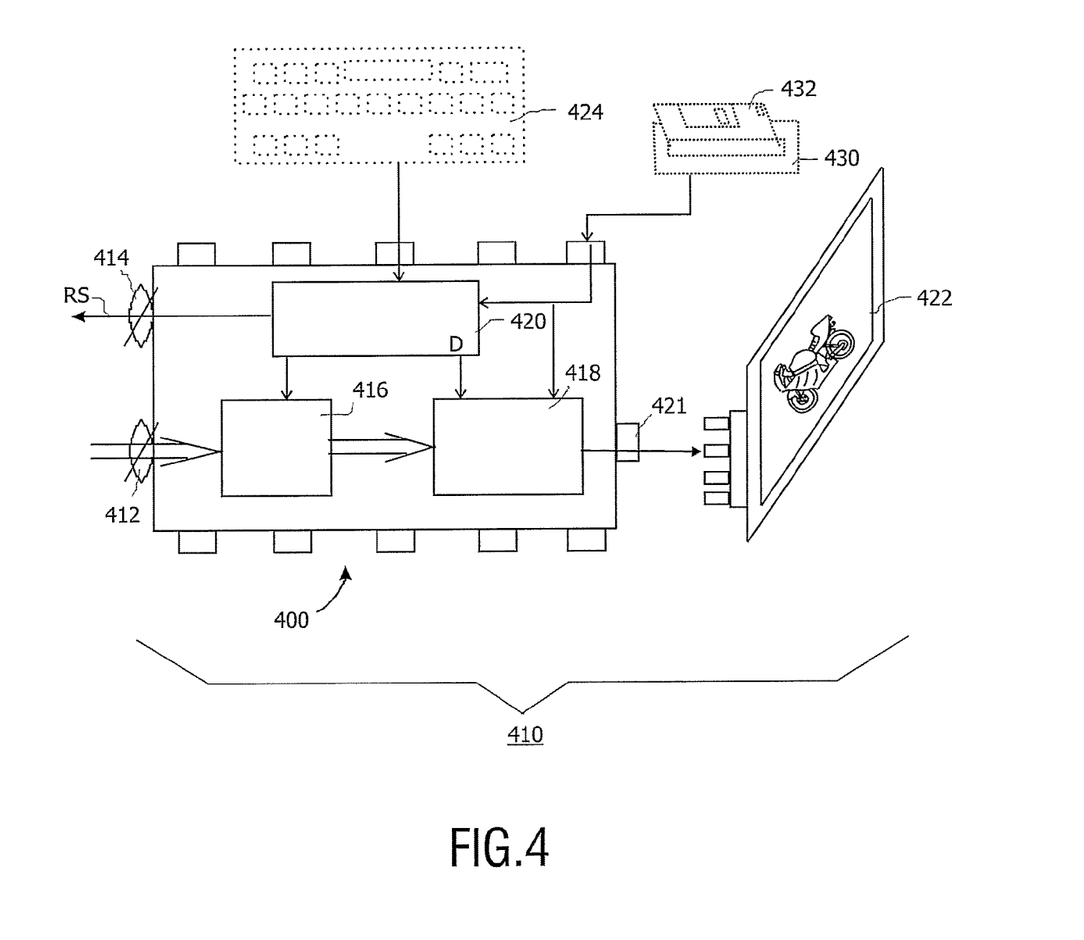
FIG. 4 schematically shows a picture display device comprising a picture data receiver according to the invention.

A content provider may (dynamically) allocate different bit-rates to the different resolution/SNR streams (including bit-rate zero if the are not encoded/transmitted/ . . . ), but also a receiving end user may subscribe to different combinations of the streams, according to his requirements (e.g. watching t.v. at home and going outside with a portable picture display device 410). For aiding this choice the provider may also provide indications of the quality obtainable from the different streams.

FIG. 4 schematically shows a picture display device 410 in which a picture data receiver 400 is connected to a display 422, e.g. an LCD display of a portable apparatus. The picture data receiver 400 has a connection 412 for receiving decoded picture data (i.e. e.g. coHR,LQ, coMR,MQ and coHR,HQ) connected to an input of a comprised data receiving unit 416. Depending on what the channel connected to the connection 412 is, the data receiving unit 416 may perform several processing steps known from prior art such as e.g.:

if the channel is a broadcast t.v. channel (e.g. accessed via an antenna), the data receiving unit 416 typically contains a tuner for tuning to the required channel(s) and down-conversion from transmission frequency to baseband frequency, etc., yielding as an output e.g. an MPEG stream; or if the channel is the internet accessed via a telephone connection 412, the data receiving unit 416 may perform e.g. TCP/IP functions, contain predefined web-addresses etc, also yielding as an output a standard encoded picture format (e.g. JPEG).

The compressed picture data is inputted to a scalable picture decompression device 418 (300 as described above) connected to the data receiving unit 416 output. The picture decompression device 418 outputs a decoded picture via an output 421.

The picture data receiver 400 may be constructed further comprising a processor 420 arranged to determine a decompression mode D indicating from which data combination output pictures to be output via output 421 are to be reconstructed, the combination at least including high resolution encoded data (coHR,LQ) and lower resolution encoded data (coMR,MQ). E.g. the user may input conditioning data (such as bandwidth he is agreeing to pay for, or a specific selection from available enhancement streams from an interface program also indicating resulting quality differences) via a user interface means 424 (e.g. a keyboard but this could also be other known means, such as e.g. graphical input means, dedicated interaction parts such as knobs, or a speech interface). The processor 420 is further arranged to (re)configure the picture decompression device 418, e.g. switching on required decoders and laying connections with the required scalers. It may further be arranged to send a signal RS to the provider via a second connection 414 (may physically be integrated with connection 412 or via another channel technology e.g. airway broadcast input vs. internet output), specifying e.g. which other data need to be sent (the latter being e.g. advantageous in in-home network systems). A program specifying the capabilities of the processor 424 may be supplied via a code input means 430 (e.g. a disk drive or network connection to remote server) e.g. on a disk or other computer program product 432.

Figure 5:
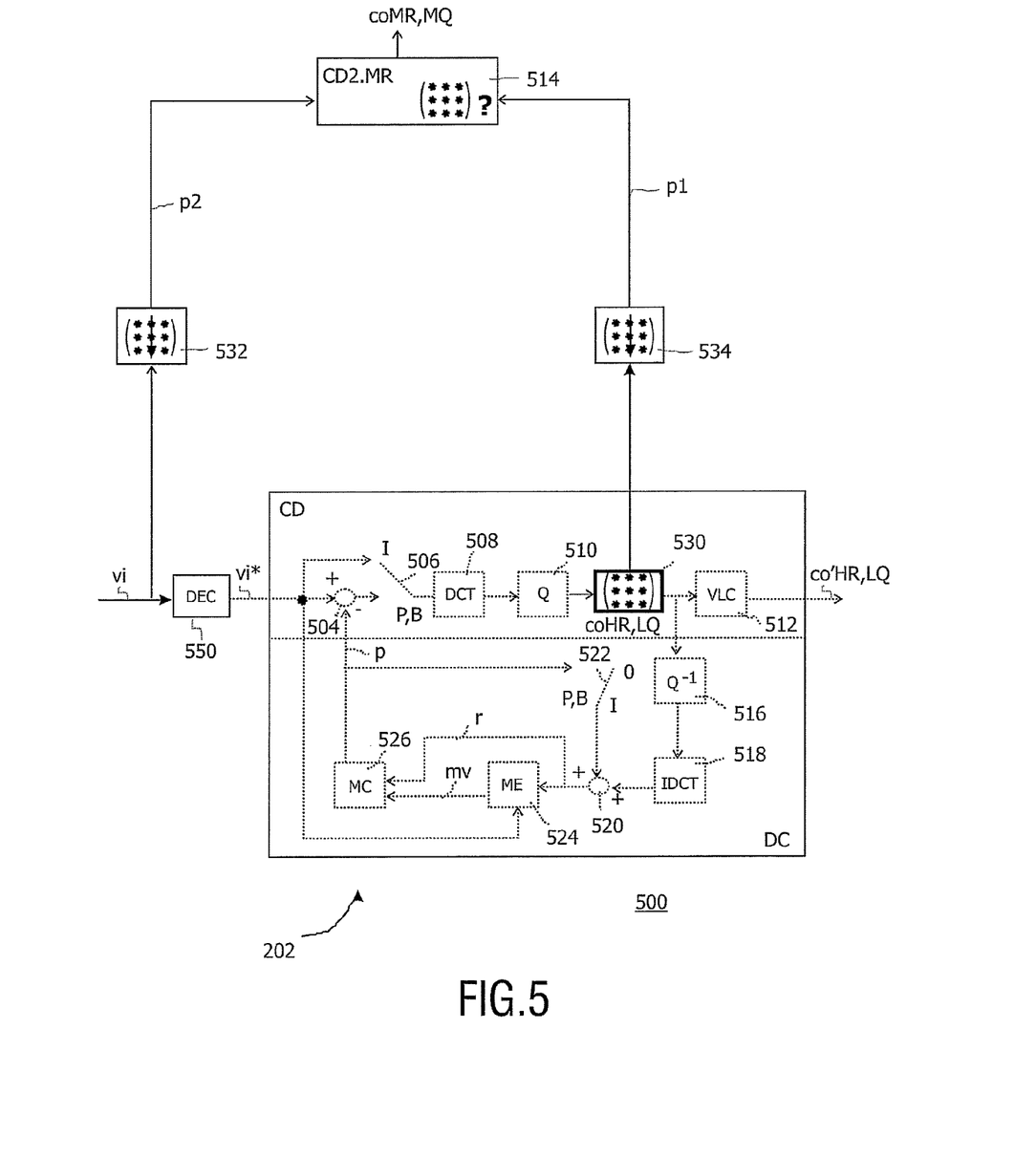
FIG. 5 schematically shows another exemplary embodiment of the picture compression device according to the invention.

As also on the compression side scaling may be realized in the compressed/transform domain, FIG. 5 schematically shows another embodiment 500 of the picture compression device according to the invention. In the picture compression device 500, the quantized DCT coefficients are stored in a memory 530, for the remainder the encoder 102 part is realized as described above. It is assumed that input signal vi is already (lossless) DCT transformed (otherwise this can be achieved by an extra DCT transformer). A decoded signal vi* is obtained from decoder 550.

The scaling is now performed on the DCT transformed data by a first down-scaler 532 and second down-scaler 534 yielding the particular embodiments of the second down-scaled representative picture p2 and the first down-scaled representative picture p1 respectively, and the comparison is performed in the lower resolution encoder embodiment 514 (e.g. on the basis of the difference between both sets of DCT coefficients, taking into account heuristics on the importance of particular coefficients to visual quality). The skilled person realizes that other variants of the picture compression device 500 may first scale in the DCT domain and then decode and compare, mutatis mutandis to what was described for the decompression device above.

Figure 6:
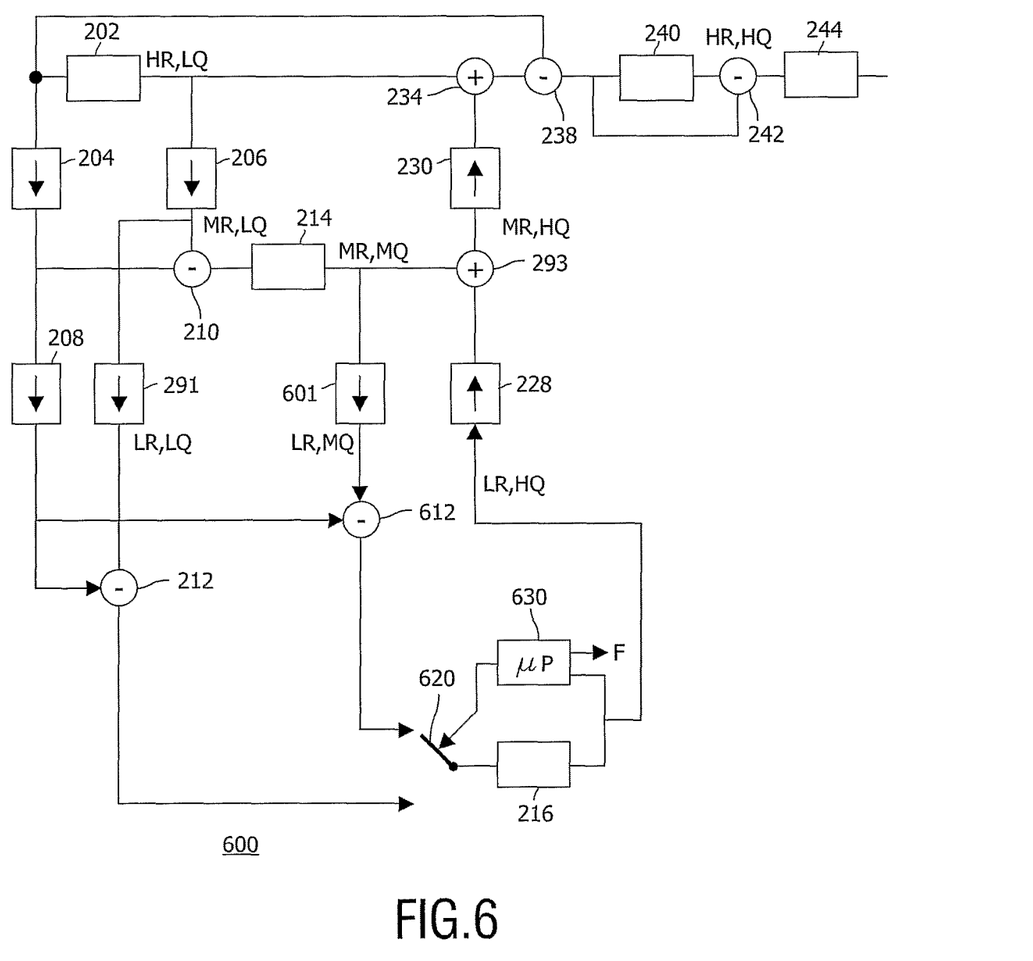
FIG. 6 schematically shows another exemplary embodiment of the picture compression device, especially tuned for a low resolution use.

The topology of FIG. 2, in which the already encoded reference signal for the low resolution is taken after two medium resolution enhancements, is not very optimal for a low resolution user, since he may have to subscribe to a lot of bits of the medium resolution, which mainly encode for sharpness which is lost due to downscaling. Therefore the scheme in FIG. 6 provides an earlier feed of already encoded data to the low resolution. With this exemplary tri-resolution encoder 600, the provider has an option to encode as low resolution enhancement data (by encoder 216) either what is desirable for improving the already encoded signal from the chain comprising encoders 202 and 214, or for improving the twice down-scaled base data from encoder 202. Thereto switch 620 is under the control of processor 630. The processor 620 is arranged to switch the switch 620 between or even within a single broadcast, depending on such criteria as e.g. bandwidth, quality, type of user(s), switch of a user to a different display (e.g. the lower resolution version being relayed to a user's portable device when he moves outside), etc. Preferably also a type indicator F is sent to the receiving side (e.g. a storage device) so that the receiving end knows what the data represents, and e.g. to which enhancement data from higher resolutions should be subscribed. Alternatively, both types of low resolution enhancement data may also be encoded simultaneously. Schematically drawn adder 293 is preferably of a special type taking into account the setting of switch 620. E.g. it may add an average contribution of the medium and low resolution enhancement to the base signal, and for the upper setting of switch 620 it may add both enhancements. The different resolution branches may be augmented with further enhancement encoders after the feeds to the lower resolution branches.

The algorithmic components disclosed may in practice be (entirely or in part) realized as hardware (e.g. parts of an application specific IC) or as software running on a special digital signal processor, a generic processor, etc.

Under computer program product should be understood any physical realization of a collection of commands enabling a processor—generic or special purpose—, after a series of loading steps to get the commands into the processor, to execute any of the characteristic functions of an invention. In particular, the computer program product may be realized as data on a carrier such as e.g. a disk or tape, data present in a memory, data traveling over a network connection—wired or wireless—, or program code on paper. Apart from program code, characteristic data required for the program may also be embodied as a computer program product.

It should be noted that the above-mentioned embodiments illustrate rather than limit the invention. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. A computer readable memory storing a collection of commands executable by a processor for spatial and SNR scalable picture compression, wherein the collection of commands performed by the processor includes:
   high resolution encoding of an input picture yielding high resolution encoded data;
   deriving a first down-scaled representative picture on the basis of the high resolution encoded data;
   deriving a second down-scaled representative picture on the basis of the input picture; and
   lower resolution encoding yielding lower resolution quality enhancement data, usable for improving the visual quality of a picture reconstructable from the high resolution encoded data, on the basis of comparing the first down-scaled representative picture with the second down-scaled representative picture, such that the lower resolution is lower than and not equal to the high resolution.

2. The computer readable memory storing a collection of commands executable by a processor for spatial and SNR scalable picture compression as claimed in claim 1, wherein deriving the first down-scaled representative picture comprises:

decoding the high resolution encoded data, yielding high resolution decoded data; and down-scaling the high resolution decoded data, yielding low quality lower resolution decoded data being the down-scaled representative picture;

wherein deriving a second down-scaled representative picture is done by down-scaling a non-encoded input picture, yielding a lower resolution version of the input picture being the second down-scaled representative picture;

and wherein the comparing comprises subtracting the low quality lower resolution decoded data from the lower resolution version of the input picture.

3. The computer readable memory as claimed in claim 1, wherein sequential input pictures are compressed, and wherein the high resolution encoding yields the high resolution encoded data with a bit-rate lower than or equal to a predetermined first bit-rate.

4. The computer readable memory as claimed in claim 3, wherein the high resolution encoding yields the high resolution encoded data with a fixed or maximum first bit-rate between 100 and 400 kbit/s.

5. The computer readable memory as claimed in claim 3, wherein the sum of the bit-rates of the high resolution encoded data and the lower resolution quality enhancement encoded data is smaller than or equal to a specified second bit-rate.

6. The computer readable memory as claimed in claim 1 wherein sequential input pictures are compressed, wherein the high resolution encoding and the lower resolution encoding each have their separate motion estimation and motion compensation steps.

7. A computer readable memory storing a collection of commands executable by a processor for decoding spatial and SNR scalable encoded picture data, wherein the collection of commands performed by the processor includes:

receiving high resolution encoded data;

receiving lower resolution quality enhancement encoded data for improving the visual quality of a picture reconstructable from the high resolution encoded data; and constructing an output picture of an output resolution smaller than or equal to the high resolution on the basis of the high resolution encoded data and the lower resolution quality enhancement encoded data scaled to the output resolution.

8. A spatial and SNR scalable picture compression device, comprising:

a high resolution encoder arranged to encode an input picture into high resolution encoded data;

first down-scaling means arranged to derive a first down-scaled representative picture on the basis of the high resolution encoded data;

second down-scaling means arranged to derive a second down-scaled representative picture on the basis of the input picture; and a lower resolution encoder arranged to yield lower resolution quality enhancement data, usable for improving the visual quality of a picture reconstructable from the high resolution encoded data, on the basis of a comparison signal from a comparator arranged to compare the first down-scaled representative picture with the second down-scaled representative picture, such that the lower resolution is lower than and not equal to the high resolution.

9. A spatial and SNR scalable picture compression device as claimed in claim 8, wherein the first down-scaling means comprises a serial processing chain of a decoder arranged to decode the high resolution encoded data into high resolution decoded data and a down-scaler arranged to down-scale the high resolution decoded data into low quality lower resolution decoded data being the down-scaled representative picture; wherein the second down-scaling means comprises a non-encoded signal down-scaling unit arranged to down-scaling a non-encoded input picture into a lower resolution version of the input picture being the second down-scaled representative picture; and wherein the comparator comprises a subtracter arranged to subtract the low quality lower resolution decoded data from the lower resolution version of the input picture, yielding the comparison signal.

10. A spatial and SNR scalable picture decompression device, comprising:

means for receiving high resolution encoded data;

means for receiving lower resolution quality enhancement encoded data for improving the visual quality of a picture reconstructable from the high resolution encoded data;

at least one scaling means arranged to scale an inputted picture from its input resolution to a predetermined output resolution;

adding means for adding together two input pictures; and at least one decoding means arranged to decode an encoded input picture;

wherein the scaling, adding and decoding means are connected in picture processing order as:

a high resolution decoder arranged to decode the high resolution encoded data yielding high resolution decoded data and a lower resolution decoder arranged to decode the lower resolution quality enhancement encoded data yielding lower resolution quality enhancement decoded data, a down-scaler arranged to down-scale the high resolution decoded data to the predetermined output resolution, yielding a base picture and a scaler arranged to scale to the predetermined output resolution the lower resolution quality enhancement decoded data, yielding an enhancement picture, and an adder arranged to add the base picture and the enhancement picture, yielding an output picture.

* * * * *